United States Patent [19]

Sumser

[11] Patent Number: 4,693,085
[45] Date of Patent: Sep. 15, 1987

[54] DEVICE FOR INCREASING THE ROTATIONAL SPEED OF AN EXHAUST GAS TURBO-CHARGER ON AN INTERNAL COMBUSTION ENGINE

[75] Inventor: Siegfried Sumser, Stuttgart, Fed. Rep. of Germany

[73] Assignee: Daimler-Benz Aktiengesellschaft, Fed. Rep. of Germany

[21] Appl. No.: 897,632

[22] Filed: Aug. 18, 1986

[30] Foreign Application Priority Data

Aug. 16, 1985 [DE] Fed. Rep. of Germany ....... 3529280

[51] Int. Cl.⁴ ............................................. F02B 37/00
[52] U.S. Cl. ........................................ 60/611; 417/89
[58] Field of Search ................. 60/600, 601, 605, 611; 417/89

[56] References Cited

U.S. PATENT DOCUMENTS 3,049,865  8/1962  Drayer .................................. 60/611
3,059,415  10/1962  Birmann ............................... 60/611

FOREIGN PATENT DOCUMENTS 1451898  7/1969  Fed. Rep. of Germany ........ 60/611
2542970  3/1977  Fed. Rep. of Germany ........ 60/611

Primary Examiner—Michael Koczo

[57] ABSTRACT

The invention concerns a device for increasing the rotational speed of an exhaust gas turbo-charger on an internal combustion engine. The compressor casing of the exhaust gas turbo-charger is located in the engine air induction duct. The compressor includes a compressor impeller and a volute-shaped gas duct, a guide device being located in the induction duct upstream of the suction-side opening of the gas duct. In order to reduce the power consumption of the compressor during idling and lower part-load operation, the inducted air is guided into a bypass duct by means of the guide device, the bypass duct entering the induction duct downstream of the compressor. The compressor is partially evacuated by means of a pressure-reducing device located in the bypass duct.

7 Claims, 2 Drawing Figures

DEVICE FOR INCREASING THE ROTATIONAL SPEED OF AN EXHAUST GAS TURBO-CHARGER ON AN INTERNAL COMBUSTION ENGINE

BACKGROUND AND SUMMARY OF THE INVENTION

The invention concerns a device for increasing the rotational speed of an exhaust gas turbo-charger on an internal combustion engine.

In order to increase the rotational speed of the supercharger turbine during acceleration from the part-load range, it is known from the category-forming U.S. Pat. No. 3,049,865 to branch off a bypass duct from the induction duct upstream of a blocking device. The bypass duct enters the induction duct downstream of the super charger, a device for reducing the cross-section through which flow can take place being arranged in the bypass duct. However, in this arrangement, it is a disadvantage that in the part-load range no fresh air enters the compressor, so that the temperature of the air which is situated in the compressor and which is constantly circulated increases, whereby overheating of the bearing of the compressor cannot be ruled out.

From West German Offenlegungsschrift No. 2,542,970, a super-charged internal-combustion engine is known, to which, under conditions of inadequate air supply, auxiliary air is supplied through the exhaust gas turbo-charger by means of an injector, which is acted upon with compressed air from a compressed air container and which is constructed as a Laval nozzle. The auxiliary air conveyed by the injector is supplied to the air charge duct downstream of the exhaust gas turbo-charger. However, in this arrangement it is a disadvantage that, during the supply of the auxiliary air, the power consumption of the compressor of the exhaust gas turbo-charger is not reduced.

A super charged internal-combustion engine with a duct bypassing the compressor is disclosed in West German Auslegeschrift No. 1,451,898. On the downstream side of the compressor, the air induction duct and the bypass duct are alternatively closed by a blocking valve. The actuation of the blocking valve takes place in dependence upon the rotational speed of the exhaust gas turbo-charger or upon the feed pressure. However, in this arrangement it is a disadvantage that, when the induction duct is blocked, the power consumption of the compressor is not reduced.

An exhaust gas turbo-charger on an internal combustion engine with an annular-shaped duct with variable guide vanes located in the region of the suction-side opening of the compressor is known from German Patent No. 1,291,943. A disadvantage of this arrangement, however, is that the extra ducting of the combustion air increases the flow resistance due to the duct and the guide vanes located within it, particularly in the full load operation of the internal combustion engine and that, in consequence, the efficiency of the exhaust gas turbo-charger is reduced. In addition, the construction and control of the adjustable guide vanes is found to be complicated and expensive.

An object of the invention is to reduce the power consumed by the compressor during idling and lower part-load operation of the internal combustion engine.

The invention achieves this object by providing an ejector type Laval nozzle in the bypass duct having an annulus communicated with the compressor gas duct to effectively evacuate the gas duct and increase the compressor speed.

In preferred embodiments unloaded non-return valves are provided respectively in the bypass duct downstream of the ejector nozzle and in the induction duct between the compressor outlet and the bypass inlets. In especially preferred embodiments an automatic control mechanism is provided for controlling a guide device to guide air to the bypass duct when the turbo charger rotational speed falls below a predetermined value.

The device according to the invention has the advantage that in those operating phases in which the internal combustion engine having an exhaust gas turbo-charger operates under suction, the power consumed by the compressor can be reduced by partial evacuation of the gas duct so that increased exhaust gas turbo-charger idling speed occurs at the same turbine power. In consequence, a higher charge pressure is available at the beginning of the supercharge operation. The unsteady region is passed through in a shorter period. Since flow only occurs through the device when it is required, there is no disadvantageous change to the flow resistance and to the efficiency of the exhaust gas turbo-charger in the upper part-load and full load range. Furthermore, no expensive control is needed for operating the simple maintenance-free device because, using the guide device, it is only necessary to guide the induction airflow into the bypass duct.

Further objects, features, and advantages of the present invention will become more apparent from the following description when taken with the accompanying drawings(s) which show, for purposes of illustration only, an embodiment/several embodiments in accordance with the present invention.

DETAILED DESCRIPTION OF THE DRAWINGS

Figure 1:
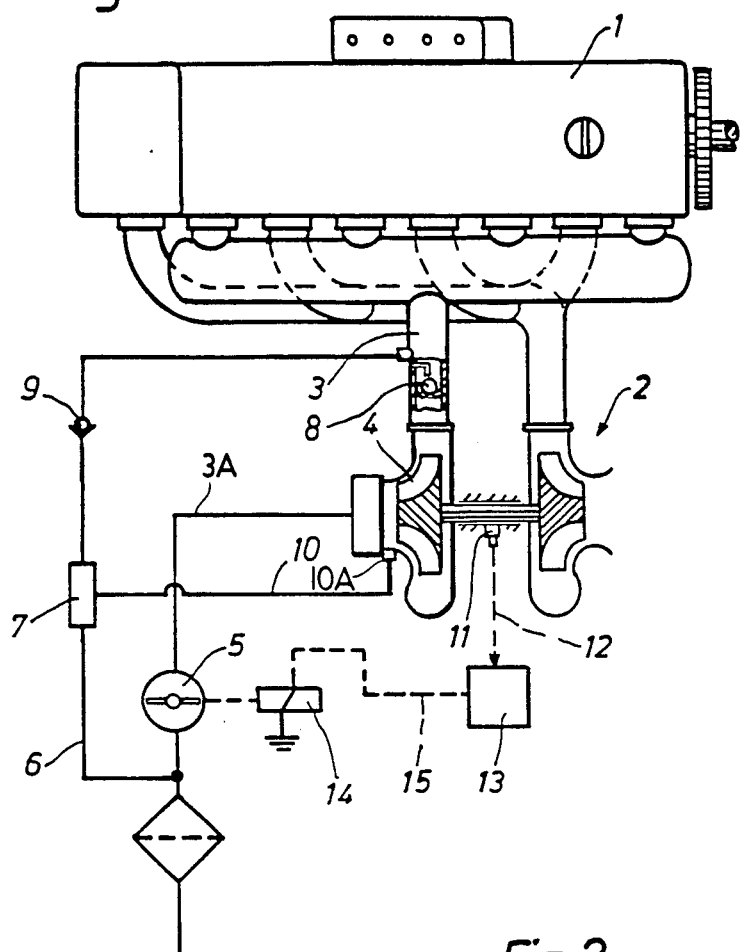
FIG. 1 diagrammatically illustrates an arrangement of a device for increasing the rotational speed of the exhaust gas turbo-charger on an internal combustion engine, constructed in accordance with a preferred embodiment of the invention.

In FIG. 1, an air-compressing internal combustion engine with an exhaust gas turbo-charger 2 is indicated by 1. There is a guide device 5 disposed upstream of a compressor 4 located in air induction duct 3 of the internal combustion engine 1. A bypass duct 6 with an ejector 7 branches off of an air inlet line upstream of guide device 5. The bypass duct 6 enters into the induction duct 3 downstream of the compressor 4 and an unloaded non-return valve 8. An unloaded non-return valve 9 is located downstream of the ejector 7 in the bypass duct 6, from which ejector a pipe-shaped duct 10 leads to the inlet-side opening of the gas duct, schematically depicted at 10A, of the compressor 4. The rotational speed of the exhaust gas turbo-charger is recorded by a sensor 11, which is an effective connection with a control unit 13 designed as a 2-point controller via a signal transmitting line 12. The control unit 13 and an electromagnetic setting drive 14 of the guide device 5 are connected by means of a line 15.

Figure 2:
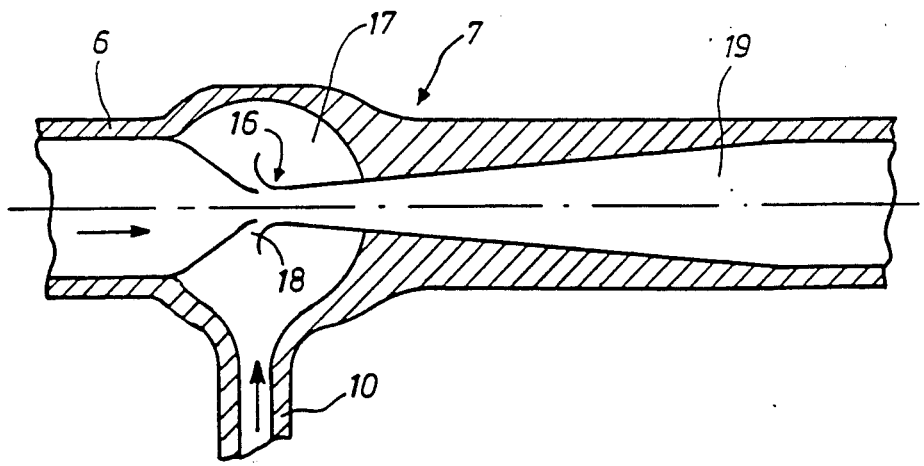
FIG. 2 is a partial schematic sectional view of an ejector in the bypass duct of FIG. 1, constructed in accordance with a preferred embodiment of the invention.

FIG. 2 shows the Laval nozzle type design of ejector 7 in the bypass duct 6, which ejector 7 is surrounded in throat-shaped region 16 by an annulus 17 into which enters the pipe-shaped duct 10. An annular nozzle-shaped induction opening 18 is located in the throat region 16 of the ejector 7. The narrowest cross-section of the ejector 7 is designed in such a way that the air flows through the throat region 16 with sonic velocity and that the critical pressure of approximately 550 mbar occurs at the conditions arising during idling and lower part-load operation of the internal combustion engine. The flow is retarded in the subsequent diffuser part 19.

If, during idling or lower part-load operation of the internal combustion engine 1, the rotational speed of the exhaust gas turbo-charger 2 falls below a specified value, the control unit 13 activates the electro-magnetic setting drive 14 which adjusts the guide device 5 in such a way that the air is deflected into the bypass duct 6. When passing through the ejector 7, the air pressure in the region of the minimum cross-section 16, in which the induction opening 18 is located, falls to approximately 550 mbar. Because of the pressure drop between the induction opening 18 and the gas duct 10A of the compressor 4, the compressor gas duct 10A is partially evacuated within half a second. The rotational speed of the exhaust gas turbo-charger is thereby increased by approximately 30%.

If the rotational speed of the exhaust gas turbo-charger exceeds a specified value, the guide device is deflected into its basic open position by means of the setting drive 14. The air is then supplied through the induction duct line 3A to the compressor 4.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Device for increasing the rotational speed of an exhaust gas driven turbo-charger on an internal combustion engine of the type having an air inlet induction duct leading to the engine, a compressor arranged in the induction duct and including a compressor casing defining a compressor inlet duct, and a bypass duct communicating air to said induction duct in bypassing relationship to the compressor, said device comprising an ejector Laval nozzle arranged in the bypass duct and having an annular nozzle shaped induction opening at its constricted throat section surrounded by an annulus which communicates with a connecting duct leading to the compressor inlet duct, whereby flow in said bypass duct effectively evacuates the compressor inlet duct.

2. Device according to claim 1, wherein one unloaded non-return valve is located in each case in the induction duct region between the compressor and the entry of the bypass duct and in the bypass duct downstream of the ejector nozzle.

3. Device according to claim 1, wherein the connecting duct enters in the opening of the compressor inlet duct.

4. Device according to claim 1, wherein the induction air-flow is automatically led away by means of a guide device into the bypass duct when the exhaust gas turbo-charger rotational speed falls below a specified value.

5. Device according to claim 2, wherein the induction air-flow is automatically lead away by means of a guide device into the bypass duct when the exhaust gas turbo-charger rotational speed falls below a specified value.

6. Device according to claim 3, wherein the induction air-flow is automatically led away by means of a guide device into the bypass duct when the exhaust gas turbo-charger rotational speed falls below a specified value.

7. Device according to claim 1, wherein a guide device is disposed in an air intake line downstream of the connection of the bypass duct to the gas induction duct, said guide device being selectively operable to block and unblock the flow of air to the compressor.

* * * * *